United States Patent
Hofmann

(10) Patent No.: US 6,477,371 B1
(45) Date of Patent: Nov. 5, 2002

(54) METHOD AND CONFIGURATION FOR TRANSMITTING DATA

(75) Inventor: Ludwig Hofmann, Ilmmünster (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,262

(22) Filed: Sep. 27, 1999

Related U.S. Application Data

(63) Continuation of application No. PCT/DE98/00550, filed on Feb. 24, 1998.

(51) Int. Cl.⁷ .............................. H04Q 7/20; H04Q 7/00; H04B 1/16
(52) U.S. Cl. ...................... 455/434; 455/334; 455/436; 455/442; 370/332
(58) Field of Search ................... 455/422, 436, 455/437, 438, 73, 442, 434, 78, 84, 87, 101, 575, 146, 147, 334; 370/331, 332, 337

(56) References Cited

U.S. PATENT DOCUMENTS

| | | | |
|---|---|---|---|
| 4,715,048 A | * 12/1987 | Masamura | 375/347 |
| 5,117,236 A | 5/1992 | Chang et al. | |
| 5,117,502 A | * 5/1992 | Onoda et al. | 455/437 |
| 5,231,632 A | * 7/1993 | Yamao et al. | 370/331 |
| 5,239,697 A | * 8/1993 | Kosuga | 455/133 |
| 5,430,416 A | * 7/1995 | Black et al. | 332/145 |
| 5,481,571 A | 1/1996 | Balachandran et al. | |
| 5,483,668 A | * 1/1996 | Malkamaki et al. | 455/432 |
| 5,625,874 A | 4/1997 | Uchida et al. | |
| 5,640,414 A | * 6/1997 | Blakeney, II et al. | 375/200 |
| 5,640,679 A | * 6/1997 | Lundqvist et al. | 455/525 |
| 5,710,789 A | * 1/1998 | Snodgrass et al. | 370/515 |
| 5,722,053 A | * 2/1998 | Kornfeld et al. | 455/86 |
| 5,809,405 A | * 9/1998 | Yamaura | 455/553 |
| 5,896,570 A | * 4/1999 | Saunders et al. | 455/437 |
| 6,108,548 A | * 8/2000 | Furukawa et al. | 455/442 |
| 6,223,036 B1 | * 4/2001 | Kuwabara | 455/434 |
| 6,226,505 B1 | * 5/2001 | Uda | 455/255 |

FOREIGN PATENT DOCUMENTS

| | | | |
|---|---|---|---|
| EP | 0 513 308 B1 | * | 4/1995 |
| GB | 2281478 A | | 3/1995 |
| GB | 2 328 582 A | * | 2/1999 |

* cited by examiner

*Primary Examiner*—Vivian Chin
*Assistant Examiner*—Charles N. Appiah
(74) *Attorney, Agent, or Firm*—Laurence A. Greenberg; Werner H. Stemer; Ralph E. Locher

(57) ABSTRACT

In the data transmission method, the radio signals of the base station that is assigned to the link at a given time are processed by a receiver component of a communications terminal. The radio signals of the base stations of the adjacent cells are processed by another receiver component of the communications terminal.

7 Claims, 3 Drawing Sheets

METHOD AND CONFIGURATION FOR TRANSMITTING DATA

CROSS-REFERENCE TO RELATED APPLICATION

This is a continuation of copending International Application PCT/DE98/00550, filed Feb. 24, 1998, which designated the United States.

BACKGROUND OF THE INVENTION

Field of the Invention

The invention relates to a method for transmitting data and to an configuration for carrying out the method. The term "data" also refers to voice data in the scope of this application. The term "transmission" covers the processes occurring during transmission and reception.

Many mobile radio systems, such as for example the pan-European mobile radio system GSM, and the GSM system adapted in the United States use a combination of the frequency division multiple access (FDMA) and time division multiple access (FDMA) methods. In each, a radio frequency channel is divided up into frames of 8 time slots, and user or control data of, as a rule, different subscribers are transmitted during the different time slots. Usually, in particular in the case of telephone operations, one time slot of a frame is assigned to one link, for transmitting and receiving, respectively.

In particular, it is possible to distinguish between the processes of transmission, reception and adjacent cell monitoring, which are usually respectively carried out in different time slots. As a result, it is possible to use a common antenna for transmitting and receiving. The antenna is thereby connected, depending on the time slot, to the transmitter or receiver component by means of a changeover switch.

Adjacent cell monitoring means that within a radio network (cellular network) which is composed of a plurality of cells the communications terminal (in particular mobile station) determines, during an established link, not only the reception quality of the radio signals of the base station assigned to the link at a given time but also the reception qualities of the radio signals of the base stations of the adjacent cells (adjacent cell monitoring).

If it becomes apparent that the reception quality of the radio signals of the base stations of an adjacent cell is better than that of the base station which is assigned to the link at a given time, the link is as a rule switched over to the base station of the adjacent cell (handover). Since these processes of reception and of adjacent cell monitoring take place as a rule in different time slots, the two processes can easily be carried out with one receiver component, and in particular with an oscillator or synthesizer, although they take place in different frequency ranges (for reasons of interference, adjacent cells usually use different frequencies).

So that relatively high data rates can be transmitted based on such a system, it is possible to assign a plurality of time slots to a link for transmitting and/or receiving. However, at very high data rates this can lead to a situation in which the communications terminal either transmits or receives in all 8 time slots. As a result, it is no longer possible to carry out any adjacent cell monitoring since this monitoring can take place only in time slots in which neither transmission nor reception is taking place.

If the data rate is increased further, it is even necessary to transmit and to receive simultaneously and still to carry out the adjacent cell monitoring. This too is impossible with the methods and configurations known to date.

SUMMARY OF THE INVENTION

It is accordingly an object of the invention to provide a method and configuration for transmitting data, which overcome the above-mentioned disadvantages of the heretofore-known methods and devices of this general type and which make it possible to transmit high data rates with minimum expenditure in cellular networks in which adjacent cell monitoring is carried out.

With the foregoing and other objects in view there is provided, in accordance with the invention, a method for transmitting and receiving data, in particular for voice data in a cellular radio network, wherein adjacent cell monitoring is carried out, which comprises:

transmitting radio signals with a base station and temporarily establishing a link with a first receiver component of a communications terminal;

processing the radio signals of the base station assigned to the link at a given time with the first receiver component; and processing the radio signals of a base station of an adjacent cell, at least at certain times, with a second receiver component of the communications terminal.

In other words, in order to transmit and receive data in cellular radio networks in which adjacent cell monitoring is usually carried out by the communications terminal, the radio signals of the base station which is assigned to the link at a given time are processed by a receiver component of a communications terminal. The radio signals of the base stations of the adjacent cells are processed, at least at certain times, by another receiver component of the communications terminal.

The invention is accordingly based on the idea of processing the radio signals of the base stations of the adjacent cells by means of a second receiver component provided for this purpose. The processing occurs at least when, owing to high data rates, the radio signals of the base stations of the adjacent cells can no longer be processed by the receiver component.

Depending on the way in which the receiver components and the downstream signal processing component are implemented by those skilled in the art, the receiver component can comprise different modules. In all cases, the processing within the two receiver components is based on a separate oscillator.

The invention makes it possible that the radio signals of the base stations of the adjacent cells (adjacent cell monitoring) can be received even during the reception (even during the same time slots) of radio signals of the base station which is assigned to the link at a given time, although the first radio signals lie in a different frequency range from that of the second radio signals.

In accordance with an added feature of the invention, the method further comprises a step of transmitting transmit and receive signals of the communications terminal via a common antenna and separating the signals from one another with a transmission/reception filter connected downstream of the antenna in a direction of signal flow.

The use of a transmission/reception filter ensures that an input selection is carried out in accordance with the frequency range of the signals and, as a result, it is possible to transmit and receive simultaneously via an antenna without the transmit signals being influenced by the receive signals, or vice versa.

In accordance with an additional feature of the invention, the radio signals of the base station assigned to the link at a given time are also received, at least at certain times, with an additional antenna. The signals are also processed with the receiver component of the communications terminal, and the signals are further processed based on an antenna diversity method.

In other words, during periods in which adjacent cell monitoring is not carried out, the radio signals of the base station which is assigned to the link at a given time are received not only by the first antenna but also by the additional antenna. The signals are thus processed not only by the first receiver component but also by the second receiver component. The above-noted antenna diversity method is well known to those of skill in this art and will, therefore, not be described in any detail.

As a result a considerable improvement in the detection of the received data can be achieved, i.e. the bit error rate can be considerably reduced by the antenna diversity method given identical conditions.

With the above and other objects in view there is also provided a communications terminal for transmitting and receiving data according to the above-outlined method. The terminal comprises:

an antenna;

a transmitter component connectible to the antenna;

a receiver component for processing the radio signals of the base station assigned to the link at a given time;

a receiver component for processing the radio signals of the base station of the adjacent cell; and a signal processing component.

In accordance with a further feature of the invention, a transmission/reception filter is connected to the antenna for separating the transmit and receive signals of the communications terminal.

In accordance with a concomitant feature of the invention, there is provided an additional antenna; and a signal processing component connectible to the additional antenna for further processing signals based on an antenna diversity method.

By introducing the invention into the system design of existing cellular mobile radio networks such as GSM, it is possible, through slight modifications of the transmission protocol, to make it possible to transmit higher data rates on the basis of the existing structures.

Other features which are considered as characteristic for the invention are set forth in the appended claims.

Although the invention is illustrated and described herein as embodied in a method and configuration for transmitting data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
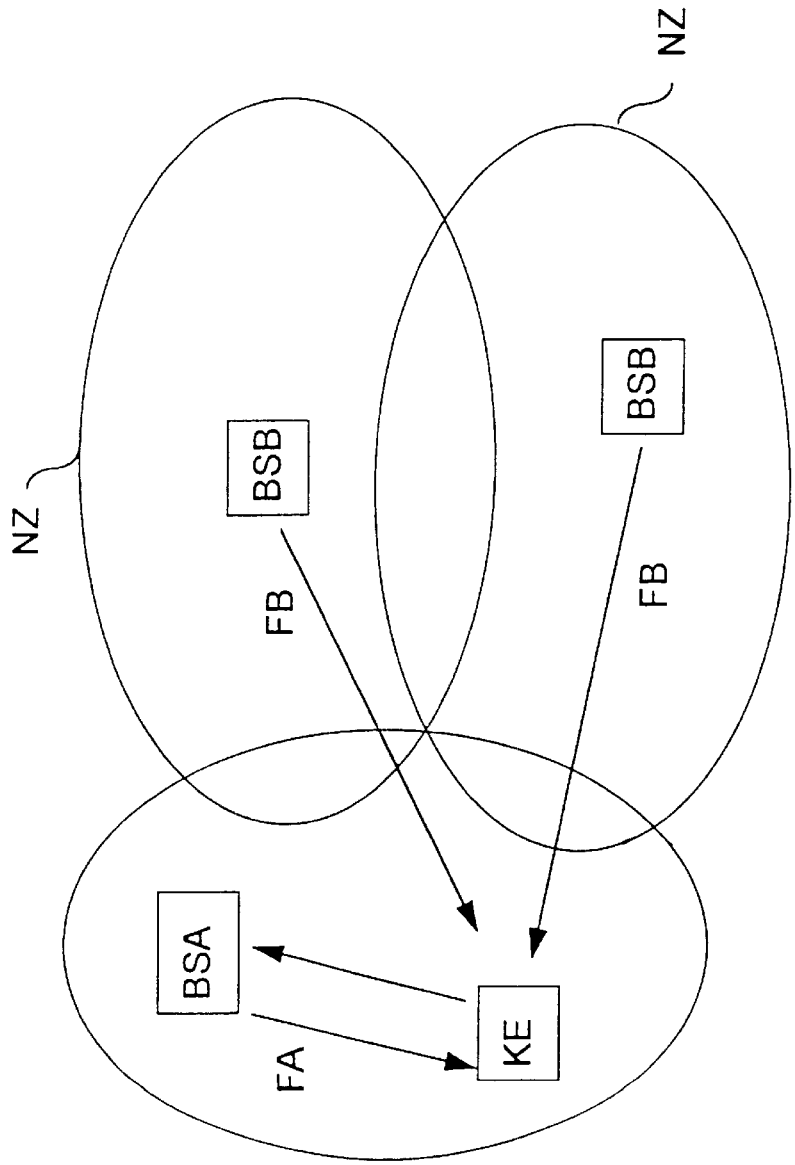
FIG. 1 is a schematic representation of the environment in which the method according to the invention can be carried out.
Figure 2:
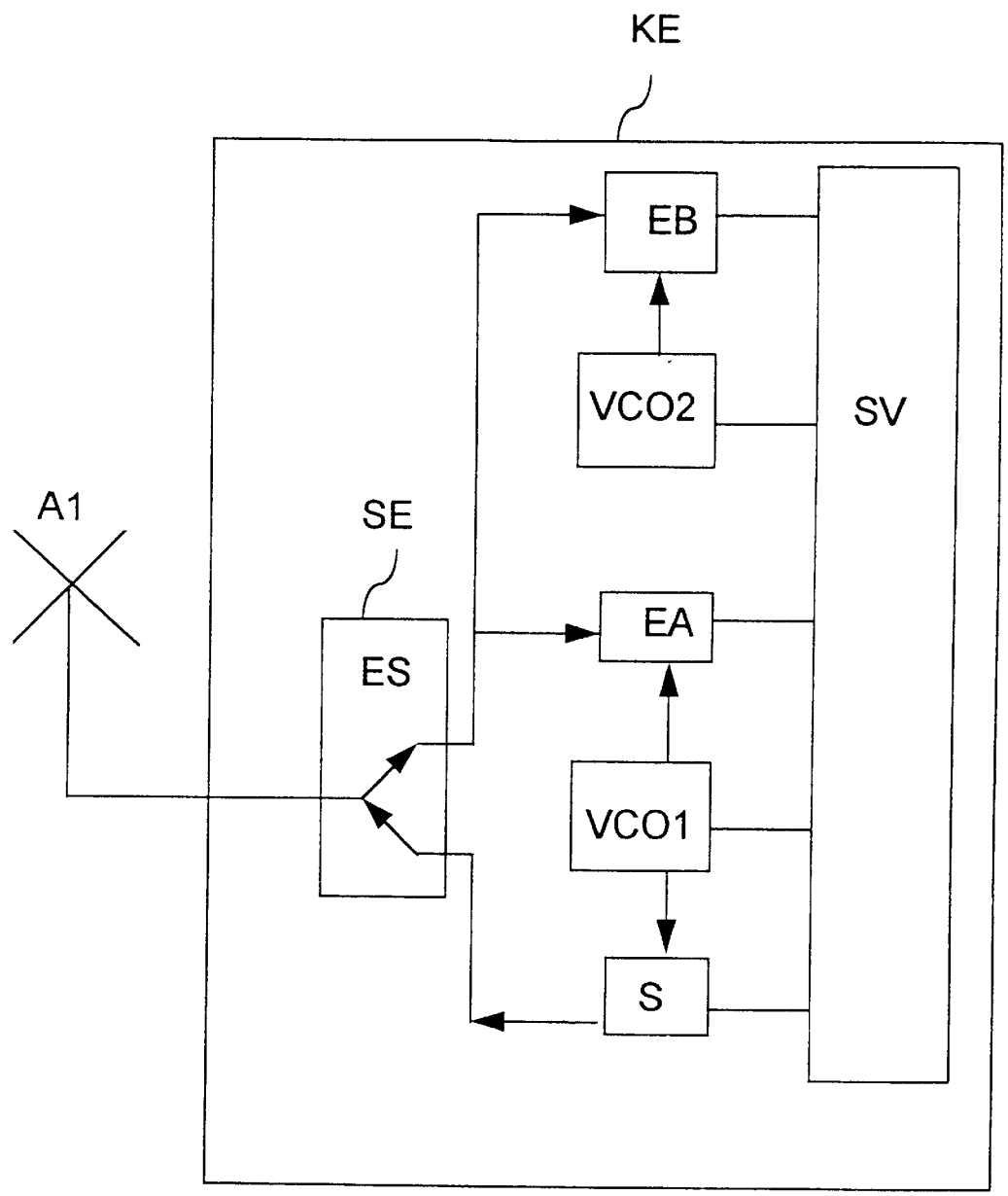
FIG. 2 is a diagrammatic view of a communications terminal according to the invention.

Referring now to the figures of the drawing in detail and first, particularly, to FIGS. 1 and 2 thereof, radio signals (FA) of a base station (BSA) which is assigned to the link at a given time are processed by a receiver component (EA) of a communications terminal (KE). Radio signals (FB) of base stations (BSB) of the adjacent cells (NZ) are processed by another receiver component (EB) of the communications terminal (KE). Depending on the way in which the communications terminal (KE) is implemented, the receiver component (EA, EB) and the signal processing component (SV) contain different modules. In all cases, the frequency ranges in which the two different receiver components (EA, EB) are operated are implemented using two different voltage-controlled oscillators (VC01, VC02).

The transmit and receive signals of the communications terminal are transmitted via a common antenna (A1) and separated from one another by means of a transmission/reception filter (SE) which is connected downstream of the antenna (A1) and using an input selection (ES). This transmission/reception filter (SE) uses filters to prevent excessive mutual interference between transmit and receive signals which are possibly transmitted at the same time.

Figure 3:
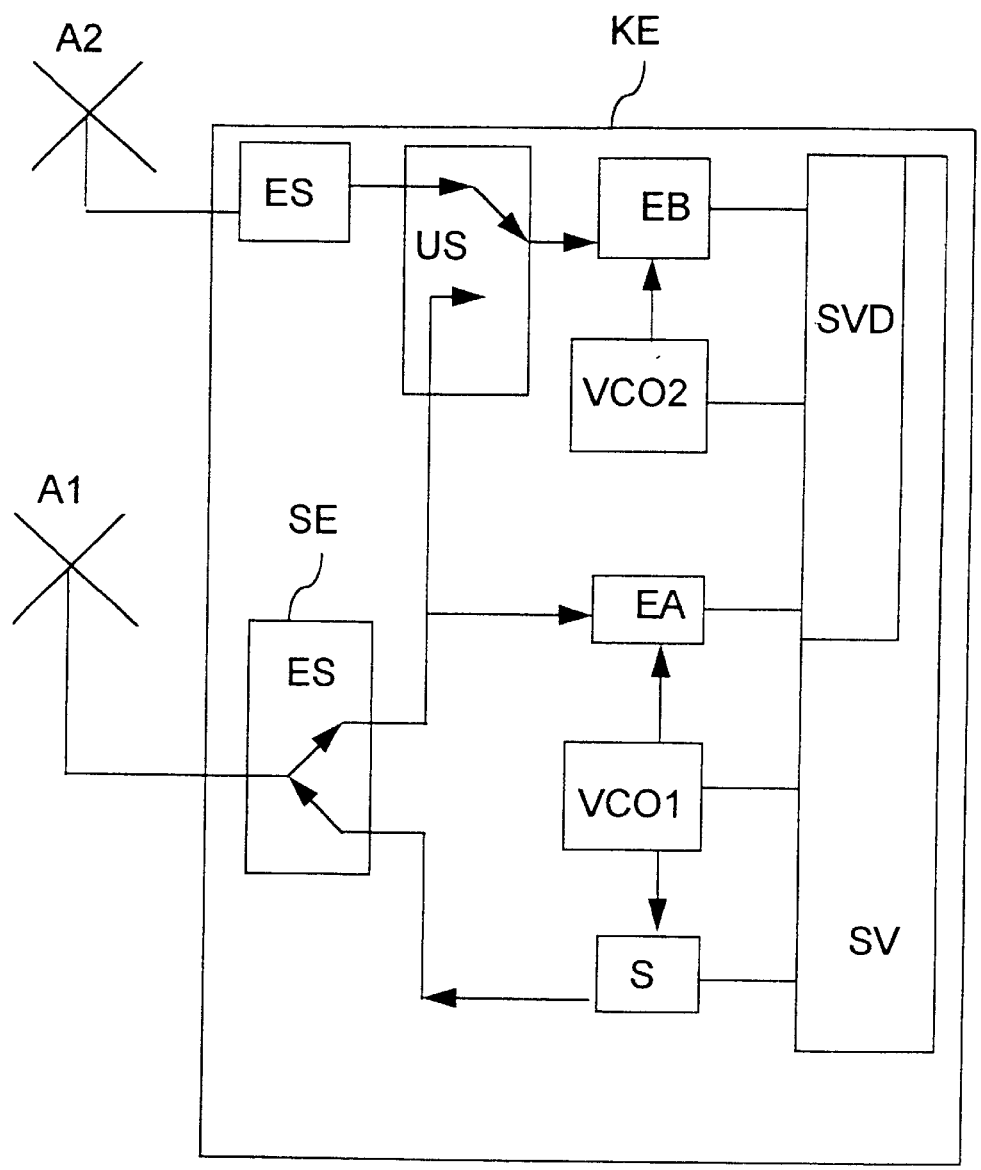
FIG. 3 is a diagrammatic view of an alternative embodiment of a communications terminal according to the invention.

In another mode of the method according to the invention, as shown in FIG. 3, during the time periods in which adjacent cell monitoring is not carried out the radio signals (FA) of the base station (BSA) which is assigned to the link at a given time are received by an additional antenna (A2) and are switched, after an input selection (ES), to the receiver component (EB) by means of a changeover switch in such a way that they can be further processed by this receiver component (EB). Subsequently, further signal processing can be carried out on the basis of the antenna diversity method. In this process, the multiple reception of the radio signals (FA) via the antennas (A1, A2) is utilized in order to detect the signals with a lower error rate.

A communications terminal (KE) according to the invention for carrying out the method is provided with an antenna (A1), a transmitter component (S), a receiver component (EA) for processing the radio signals (FA) of the base station (BSA) which is assigned to the link at a given time, a second receiver component (EB) for processing the radio signals (FB) of the base stations (BSB) of the adjacent cells and a signal processing component (SV). The different frequencies in which the two receiver components (EA, EB) are operated are implemented here using two different voltage-controlled oscillators (VC01, VC02).

An advantageous embodiment of the communications terminal according to the invention is represented schematically in FIG. 2 and, furthermore, has a transmission/reception filter (SE) for separating the transmit and receive signals of the communications terminal (KE) using an input selection (ES).

A further advantageous development of the communications terminal according to the invention is shown in FIG. 3. It is provided with an additional antenna (A2) which can be connected to the receiver component (EB) via an input selection (ES) and a changeover switch (US). In one particularly advantageous development of the communications terminal according to the invention, a signal processing component for further processing, on the basis of the antenna diversity method (SVD), the radio signals (FA) which are received in different time slots via the antenna (A1) and the antenna (A2) is provided.

I claim:

1. A method for transmitting and receiving data, wherein adjacent cell monitoring is carried out, which comprises:

assigning a first oscillator to a first receiver component of a communications terminal and assigning a second oscillator to a second receiver component of the communications terminal;

transmitting radio signals in a first frequency range with a base station and temporarily establishing a link with the first receiver component;

processing the radio signals of the base station assigned to the link at a given time with the first receiver component; and processing the radio signals of a base station of an adjacent cell, at least at certain times, with the second receiver component;

at least sometimes, receiving the radio signals of the base station of the adjacent cell while receiving the radio signals of the base station assigned to the link;

determining a reception quality of the radio signals of the base station of the adjacent cell in a second frequency range when performing the step of processing the radio signals of the base station of the adjacent cell; and switching the link over to the base station of the adjacent cell in response to the determined reception quality.

2. The method according to claim 1, wherein the base station and the communications terminal are components in a cellular radio network and the transmitting step comprises transmitting voice data with said base station.

3. The method according to claim 1, which comprises transmitting transmit and receive signals of the communications terminal via an antenna and separating the signals from one another with a transmission/reception filter connected downstream of the antenna in a direction of signal flow.

4. The method according to claim 1, which comprises also receiving the radio signals of the base station assigned to the link at a given time, at least at certain times, with an additional antenna, and also processing the signals with the second receiver component of the communications terminal, and processing the signals further based on an antenna diversity method.

5. A communications terminal for transmitting and receiving data according to the method of claim 1, comprising:

an antenna;

a transmitter component connectable to said antenna;

a receiver component for processing the radio signals of the base station assigned to the link at a given time, said receiver component having a first oscillator assigned thereto;

an additional receiver component, said additional receiver component for processing the radio signals of the base station of the adjacent cell, said additional receiver component having a first oscillator assigned thereto, said additional receiver component for at least sometimes, receiving the radio signals of the base station of the adjacent cell while said receiver component receives the radio signals of the base station assigned to the link; and a signal processing component.

6. The communications terminal according to claim 5, which comprises a transmission/reception filter connected to said antenna for separating the transmit and receive signals of the communications terminal.

7. The communications terminal according to claim 5, which further comprises;

an additional antenna; and a signal processing component connectible to said additional antenna for further processing signals based on an antenna diversity method.

\* \* \* \* \*

UNITED STATES PATENT AND TRADEMARK OFFICE
CERTIFICATE OF CORRECTION

PATENT NO. : 6,477,371 B1
DATED : November 5, 2002
INVENTOR(S) : Ludwig Hofmann

It is certified that error appears in the above-identified patent and that said Letters Patent is hereby corrected as shown below:

<u>Title page,</u>
Item [30], should read as follows:

--            Foreign Application Priority Data
      [30]    Mar. 27, 1997      (DE) ……….. 197 13 061.5 --

Signed and Sealed this

Eighteenth Day of March, 2003

JAMES E. ROGAN
*Director of the United States Patent and Trademark Office*